(12) United States Patent
Hayashi (10) Patent No.: US 6,304,381 B1
(45) Date of Patent: Oct. 16, 2001

(54) ILLUMINATION OPTICAL APPARATUS

(75) Inventor: Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/505,761

(22) Filed: Feb. 16, 2000

(30) Foreign Application Priority Data

Feb. 17, 1999 (JP) .................................................. 11-038527

(51) Int. Cl.[7] ..................................................... G02B 5/30
(52) U.S. Cl. .......................... 359/495; 359/494; 359/566; 359/626; 349/64; 349/95; 353/20; 353/30; 353/31; 353/32; 353/34
(58) Field of Search ..................................... 359/494, 495, 359/566, 626, 64, 95; 353/20, 30, 37, 32, 34

(56) References Cited

U.S. PATENT DOCUMENTS 5,280,371 * 1/1994 McCartney, Jr. et al. ............. 349/64

FOREIGN PATENT DOCUMENTS 5-346557 * 12/1993 (JP) .
7-181392 A 7/1995 (JP) .
9-318904 A 12/1997 (JP) .

* cited by examiner

*Primary Examiner*—Cassandra Spyrou
*Assistant Examiner*—Craig Curtis
(74) *Attorney, Agent, or Firm*—Sidley Austin Brown & Wood (57) ABSTRACT

An illumination optical apparatus has a light source for emitting illumination light, a first lens array having lens cells arranged regularly in a grid-like formation so that the lens cells of the first lens array will individually focus the illumination light incident thereon in different positions corresponding thereto, a second lens array having lens cells arranged regularly in a grid-like formation oriented in a different direction from the grid-like formation in which the lens cells of the first lens array are arranged, with the lens cells of the second lens array disposed in the positions in which the lens cells of the first lens array focus the illumination light, and a polarization separation device disposed between the light source and the second lens array so as to separate the illumination light coming from the light source in such a way that, through each of the lens cells of the first lens array, two components of the illumination light having mutually different polarization planes form two separate light-source images that are apart from each other along the direction of one side of the individual lens cells of the second lens array.

14 Claims, 9 Drawing Sheets

ILLUMINATION OPTICAL APPARATUS

This application is based on application No. H11-038527 filed in Japan on Feb. 17, 1999, the entire content of which is hereby incorporated by reference.

BACKGROUND OF THE INVENTION

1. Field of the Invention

The present invention relates to an illumination optical apparatus for use in display optical apparatus employing a display panel.

2. Description of the Prior Art

Figure 11:
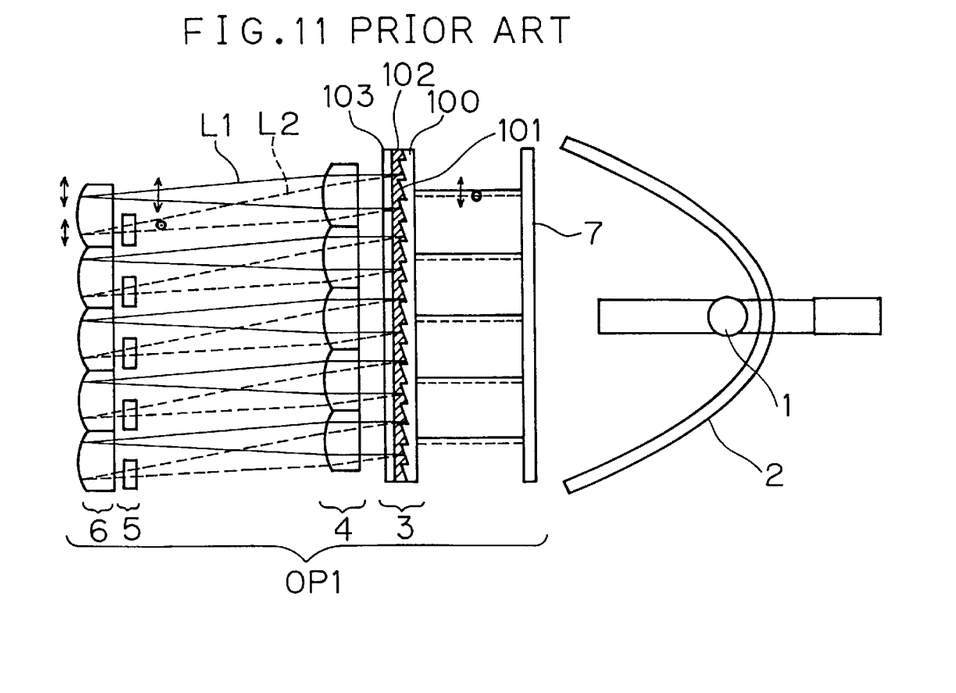
FIG. 11 a diagram schematically showing the sectional construction of a conventional illumination optical apparatus.

As one of conventional means for displaying an image, projection-type display optical apparatuses are known. Such display optical apparatuses require the use of an illumination optical apparatus to illuminate efficiently and evenly an optical image formed on a reflection-type liquid crystal display panel or the like. FIG. 11 schematically shows the sectional configuration of an illumination optical apparatus employed in a conventional display optical apparatus.

In this figure, the light emitted from a light source 1 is reflected by a reflector 2 so as to be directed, as a substantially parallel beam of non-polarized light, to the illumination optical apparatus OP1. The illumination optical apparatus OP1 is composed of, in the order in which the light beam passes through, a UV/IR (ultraviolet and infrared) cut filter 7, a birefringent diffraction grating 3, a first lens array 4, half-wave plates 5, and a second lens array 6.

The birefringent diffraction grating 3 has a blazed diffraction grating 101 (i.e. a diffraction grating having blaze-shaped grooves) formed on a substrate 100 made of glass or the like, and has a birefringent optical material 102 sealed in a portion (hatched) thereof between the blazed side of the substrate 100 and a glass plate 103. The birefringent optical material 102 exhibits different refractive indices for light polarized in different directions (i.e. light having different polarization planes); specifically, in the example shown here, the birefringent optical material 102 exhibits different refractive indices for rays L1 having a polarization plane parallel to the plane of the figure as indicated by arrows and for rays L2 having a polarization plane perpendicular to the plane of the figure as indicated by center-dotted circles. On the other hand, the diffraction grating 101 is so shaped as to deflect light that has been traveling straight.

Here, the refractive index for the rays L1 having a polarization plane parallel to the plane of the figure is made equal to the refractive index of the material of the substrate so that the rays L1 having a polarization plane parallel to the plane of the figure will travel as if there were no diffraction grating 101, as indicated by solid lines, and that the rays L2 having a polarization plane perpendicular to the plane of the figure will travel under the influence of the diffraction gating 101 so as to be deflected thereby, as indicated by broken lines.

The first lens array 4, disposed next to the birefringent diffraction grating 3, divides spatially the rays incident thereon and focuses them on the second lens array 6. Here, whereas the rays L1 having a polarization plane parallel to the plane of the figure is allowed to travel straight before being focused, the rays L2 having a polarization plane perpendicular to the plane of the figure is deflected before being focused. Accordingly, the rays L1 having a polarization plane parallel to the plane of the figure and the rays L2 having a polarization plane perpendicular to the plane of the figure are focused in spatially different positions. Thus, by disposing the half-wave plates 5 near the second lens array 6 on the light-source side thereof in such a way as to cover only the positions where the rays L1 or L2 having either of the two polarization planes described above are focused, it is possible to make uniform the polarization plane of all of the rays L1 and L2.

As a result, the illumination optical apparatus OP1 emits, as illumination light, light that is wholly polarized parallel to the plane of the figure. A birefringent optical material is obtained, for example, by orienting a liquid crystal material in a predetermined direction. This may be done by the use of a liquid crystal material that is known to harden when subjected to ultraviolet or other radiation; in that case, the liquid crystal material is subjected to ultraviolet or other radiation after the orientation mentioned above.

Figure 12:
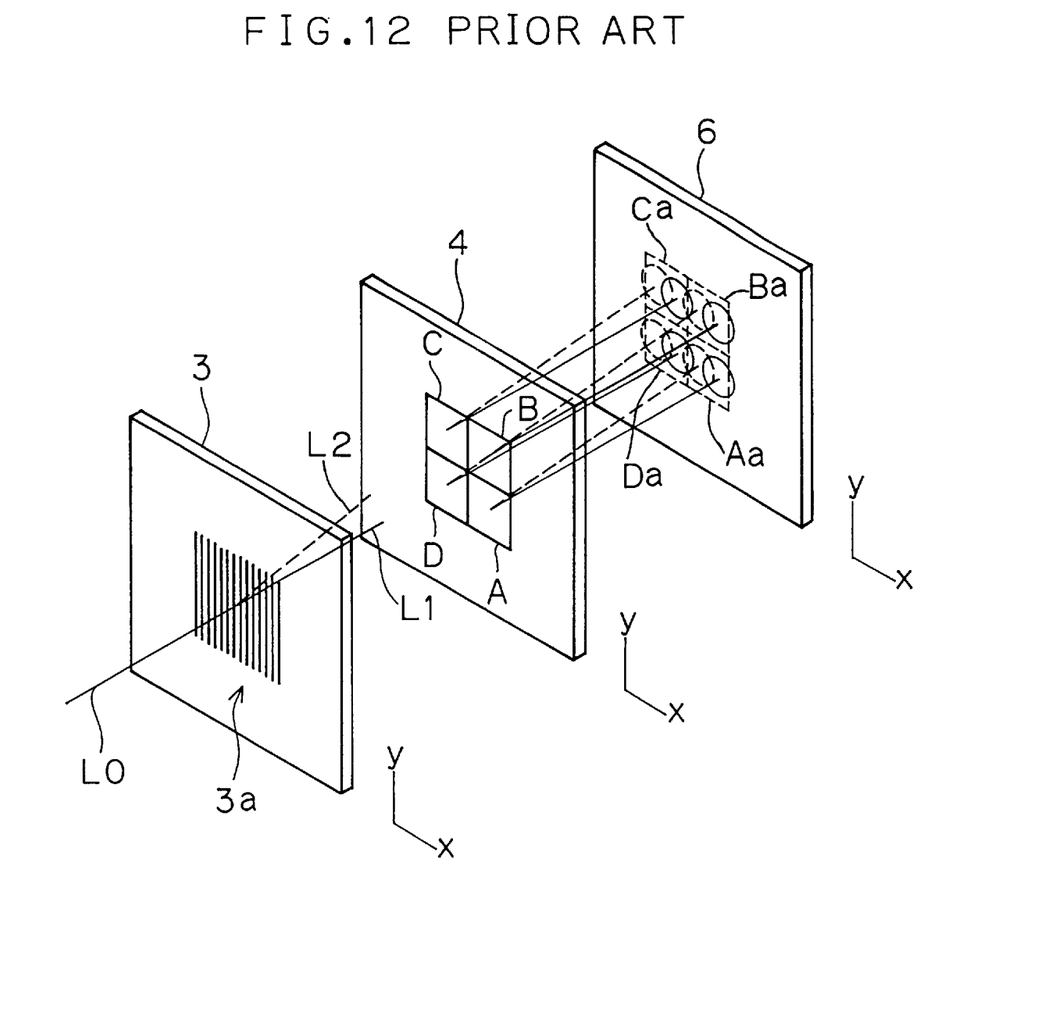
FIG. 12 is an exploded perspective view schematically showing the relationship among the birefringent diffraction grating and the first and second lens arrays in the conventional illumination optical apparatus.

FIG. 12 is an exploded perspective view schematically showing the relationship among the birefringent diffraction grating and the first and second lens arrays of the conventional illumination optical apparatus described above. In this figure, only part of the lens cells constituting the lens arrays are shown as their representatives. In this figure, the rays L0 coming from the light source 1 and the reflector 2, which are disposed on the lower left side of the figure but not shown here, are separated, by the polarization plane separation action of the blazes 3a of the birefringent diffraction grating 3, into rays 1 having a predetermined polarization plane, indicated by solid lines, and rays 2 having a polarization plane perpendicular thereto, indicated by broken lines.

These rays pass through individual lens cells A, B, C, and D arranged in a grid-like formation in the first lens array 4 and then form, on each of individual lens cells Aa, Ba, Ca, and Da arranged in a similar grid-like formation in the second lens array 6, a pair of a light-source image having the predetermined polarization plane and a light-source image having the polarization plane perpendicular thereto. In each pair, the two light-source images lie apart from each other in an exact row along the direction in which the birefringent diffraction grating 3 separates the rays. Moreover, as indicated by solid-line and broken-line ellipses (circles if seen from the front side of the lens array), these light-source images are projected on the individual lens cells of the second lens array 6 in such a way as to have an appreciable size. It is to be noted that, in the example under discussion, with respect to each optical element as seen from the light source side, a coordinate system is assumed to have a y axis pointing upward and an x axis pointing rightward.

However, in this conventional illumination optical apparatus, as described above, the separated light-source images are projected on the individual lens cells of the second lens array 6 in such a way as to have an appreciable size each, and therefore the projected light-source images overlap each other. To make uniform the polarization plane of all of these light-source images, it is necessary to dispose half-wave plates, like the half-wave plates 5 shown in FIG. 11, in such a way as to cover only the light-source images having either of the two polarization planes described above to convert their polarization plane. However, in the regions where the light-source images overlap each other, it is impossible to make the polarization plane uniform, and therefore such regions are useless. That is, the rays that pass through such regions, when they eventually reach the display panel, either have a wrong polarization plane or strike outside the effective area of the display panel, and thus do not serve as illumination light. This degrades illumination efficiency.

One way to achieve higher illumination efficiency in such a conventional illumination optical apparatus is to use a lens array having irregular apertures. For example, Japanese Laid-Open Patent Application No. H5-346557 proposes achieving higher illumination efficiency by exploiting the fact that the above-mentioned light-source images have different sizes near the center and near the edge of the second lens array, specifically by designing the second lens array to have accordingly irregular apertures at uneven intervals.

However, this method is by nature unsuitable for polarization plane conversion because the light-source images projected on the second lens array do not form an exact row and therefore it is difficult to attach the half-wave plates in the positions of the light-source images whose polarization plane needs to be converted. By contrast, in the conventional illumination optical apparatus as originally described above or in the embodiment of the present invention described later, where the light-source images form an exact row, it is possible to use strip-shaped half-wave plates and thus it is easy to attach the half-wave plates.

SUMMARY OF THE INVENTION

An object of the present invention is to provide an illumination optical paratus that achieves uniform illumination of a display panel with higher illumination efficiency.

To achieve the above object, according to one aspect of the present invention, an illumination optical apparatus is provided with: a light source for emitting illumination light; a first lens array having lens cells arranged regularly in grid-like formation so that the lens cells of the first lens array will individually focus the illumination light incident thereon in different positions corresponding thereto; a second lens array having lens cells arranged regularly in a grid-like formation oriented in a different direction from the grid-like formation in which the lens cells of the first lens array are arranged, with the lens cells of the second lens array disposed in the positions in which the lens cells of the first lens array focus the illumination light; and a polarization separation device disposed between the light source and the second lens array so as to separate the illumination light coming from the light source in such a way that, through each of the lens cells of the first lens array, two components of the illumination light having mutually different polarization planes form two separate light-source images that are apart from each other along the direction of one side of the individual lens cells of the second lens array.

According to another aspect of the present invention, a projection optical apparatus is provided with: an illumination optical apparatus as described above; a display panel that displays an image to be projected and that is illuminated by the illumination light; and a projection optical system for projecting the displayed image onto a screen.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
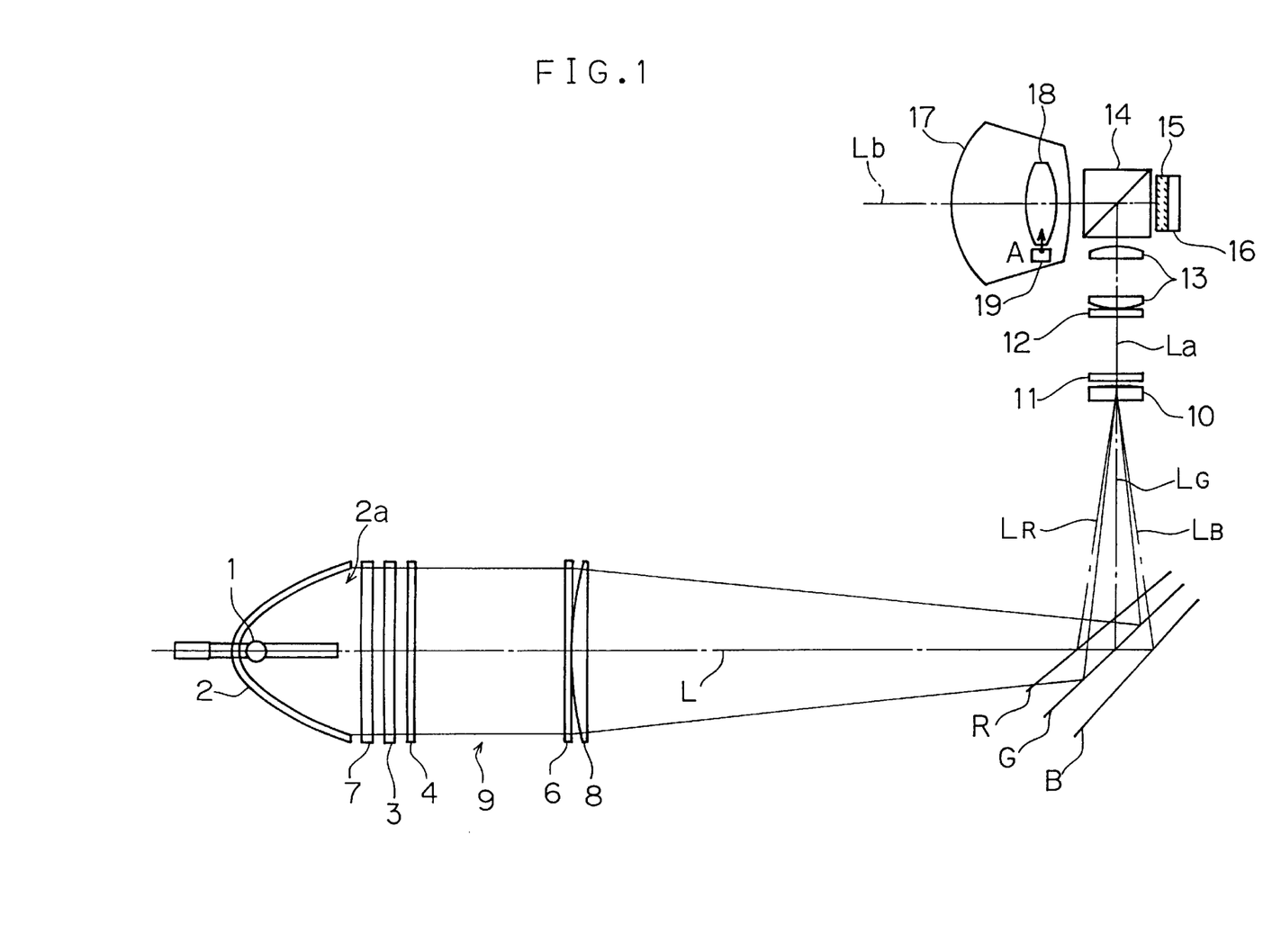
FIG. 1 is a diagram showing the overall construction of an embodiment of the present invention.

Hereinafter, an embodiment of the present invention will be described with reference to the accompanying drawings. FIG. 1 is a diagram showing the overall construction of a display optical apparatus that includes an illumination optical apparatus embodying the invention. In this figure, reference numeral 1 represents a light source, and reference numeral 2 represents a reflector disposed so as to surround the light source 1. Reference numeral 7 represents a UV/IR cut filter disposed so as to cover the light exit opening 2a of the reflector 2 to cut the ultraviolet and infrared radiation included in the light exiting from the reflector 2. Behind the UV/IR cut filter 7 (i.e., in the figure, on the right side thereof) are disposed, from the UV/IR cut filter side, a birefringent diffraction grating 3, a first lens array 4, then somewhat away therefrom, a second lens array 6, and then immediately behind it, a superimposing lens 8.

Though not shown here, the first lens array 4 has lens cells arranged in a formation shaped like a substantially square grid, and the second lens array 6 has lens cells arranged in a foundation shaped like a rectangular grid divided along different directions from the first lens array 4. The birefringent diffraction grating 3 performs polarization separation on the light 9 coming from the light source 1 and the reflector 2 to separate the light 9 in the direction of the longer sides of the individual lens cells of the second lens array 6. The light 9 coming from the light source 1 and the reflector 2 is, while traveling through the birefringent diffraction grating 3, the first lens array 4, and then the second lens array 6, subjected to polarization conversion and thereby its polarization plane is made uniform. The relationship among these optical elements will be described in detail later.

The second lens array 6 and the first superimposing lens 8 disposed immediately behind it allow the images formed on the individual lens cells of the first lens array 4 to be superimposed on one another in the vicinity of the focal point (described later) of the first superimposing lens 8. The first superimposing lens 8 may be formed integrally with the second lens array 6. Instead of using the birefringent diffraction grating 3, it is also possible to dispose a birefringent prism array or the like between the first and second lens arrays 4 and 6. The optical elements described above, starting with the first lens array 4 and ending with the first superimposing lens 8, together constitute a first integrator optical system having an optical axis L. At the focal point of the first superimposing lens 8, a condenser lens 10 is disposed.

Between the first superimposing lens 8 and the condenser lens 10, dichroic mirrors R, G, and B that reflect light of the frequency ranges corresponding to R (red), G (green), and B (blue), respectively, are disposed with different inclinations. Thus, the light 9 having passed through the first superimposing lens 8 along the optical axis L is reflected by the dichroic mirrors R, G, and B individually so as to reach the condenser lens 10 by traveling along differently inclined optical axes $L_R$, $L_G$, and $L_B$, respectively. Instead of the dichroic mirror B, it is also possible to use a total-reflection mirror.

Immediately behind the condenser lens 10 (i.e., in the figure, above it), a third lens array 11 is disposed. The third lens array 11 has lens cells arranged in a formation shaped like a rectangular grid having substantially the same aspect ratio as the display panel described later. The lens cells of the third lens array 11 are divided into one to three columns of lens cells in the direction of the longer sides of the third lens array 11; for example, in this embodiment, they are divided into two columns, as will be described later.

Behind the third lens array 11, somewhat away therefrom, a fourth lens array 12 is disposed. The fourth lens array 12 has lens cells arranged in a formation shaped like a rectangular grid similar to that of the third lens array 11, though the formations of the third and fourth lens arrays 11 and 12 do not necessarily have to be exactly (i.e. geometrically) similar to each other. The fourth lens array 12 and a second superimposing lens unit 13 disposed immediately behind it allow the images formed on the individual lens cells of the third lens array 11 to be superimposed on one another on the display panel described later. The second superimposing lens unit 13 also serves to achieve telecentric illumination of the display panel. The optical elements described above, starting with the third lens array 11 and ending with the second superimposing lens unit 13, together constitute a second integrator optical system having an optical axis La.

Behind the second superimposing lens unit 13 (i.e., in the figure, above it), a PBS (polarization beam splitter) prism 14 is disposed. The PBS prism 14 reflects S-polarized light and transmits P-polarized light. The light 9 coming from the light source 1 and the reflector 2 is, as a result of the polarization conversion mentioned above, wholly S-polarized when it enters the PBS prism 14. Thus, most of the light 9 is reflected by the PBS prism 14 and is thereby directed to a display panel 16 disposed on the right side thereof in the figure.

Immediately in front of the display panel 16, a birefringent microlens array is disposed that is made of a birefringent optical material. The light 9 having been subjected to color separation achieved by the above-mentioned dichroic mirrors and the third and fourth lens arrays then illuminates the display panel 16 through this birefringent microlens array 15 in such a way that light of different colors illuminates different pixels, as will be described in detail later. As a result, the display panel 16 as a whole is illuminated by recurrent stripes of R, G, and B light and thereby the display data of those three colors is displayed individually by the pixels illuminated by the light of the corresponding colors.

The display panel 16 is a reflection-type liquid crystal display panel that reflects pixel by pixel the light shone thereon with (for "on" pixels) or without (for "off" pixels) rotating the polarization plane thereof in accordance with the given display data. The portion of the reflected light that corresponds to "off" pixels remains S-polarized, and therefore, when it returns through the birefringent microlens array 15 to the PBS prism 14, it is reflected by the PBS prism 14 so as to be directed back toward the light source. On the other hand, the portion of the reflected light that corresponds to "on" pixels is converted into P-polarized light, and therefore, when it returns through the birefringent microlens array 15 to the PBS prism 14, it is transmitted through the PBS prism 14 so as to be directed further to a projection optical system 17 having an optical axis Lb.

The projection optical system 17 projects the display data presented on the display panel 16 onto a screen (not shown). Part of the lens elements included in the projection lens unit constituting the projection optical system 17 are, as an image shift lens 18, driven at high speed in a direction perpendicular to the optical axis Lb, as indicated by an arrow A, by an actuator 19. This helps enhance the resolution of the display data, as will be described in detail later.

Figure 2:
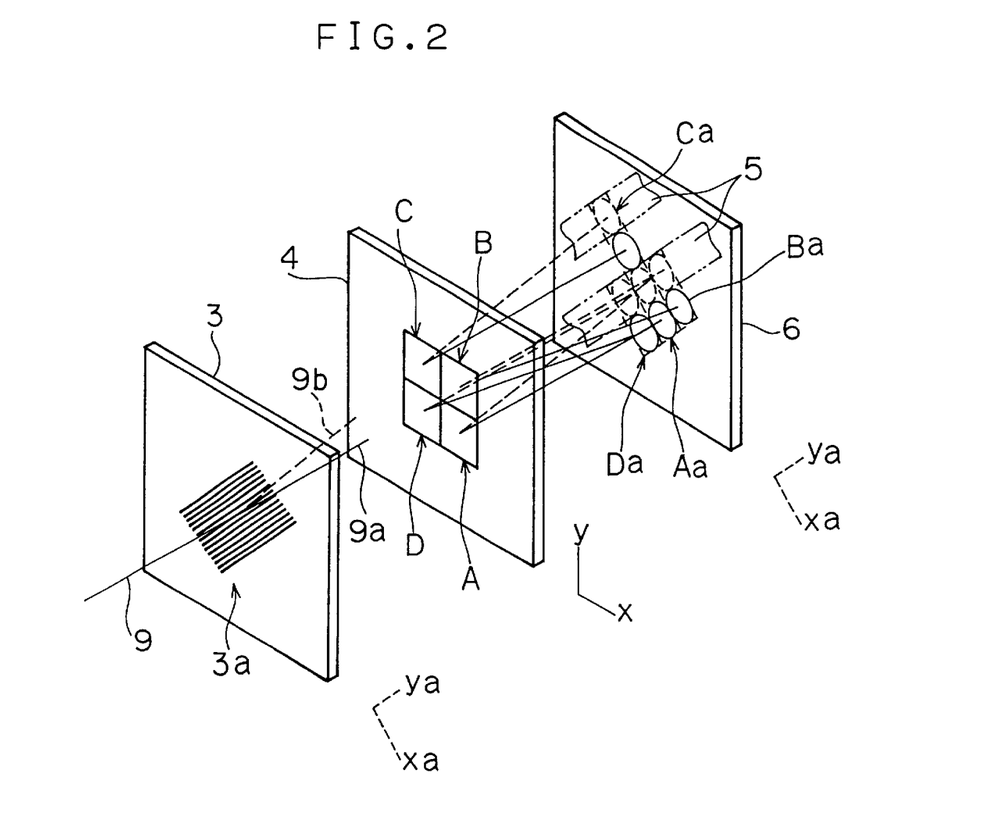
FIG. 2 is an exploded perspective view schematically showing the relationship among the birefringent diffraction grating and the first and second lens arrays used in the embodiment.

FIG. 2 is an exploded perspective view schematically showing the relationship among the birefringent diffraction grating and the first and second lens arrays used in this embodiment. In this figure, only part of the lens cells constituting the lens arrays are shown as their representatives. As shown in this figure, in this embodiment, the directions of the sides of the individual lens cells of the first lens array 4 (indicated by solid lines) are not aligned with the directions of the sides of the individual lens cells of the second lens array 6 (indicated by broken lines). On the other hand, the direction of the blazes (grooves) 3a of the birefringent diffraction grating 3 are aligned with one of the directions of the sides of the individual lens cells of the second lens array 6. Specifically, the directions of the sides of the individual lens cells of the second lens array 6 are aligned with the directions of the diagonals of the individual lens cells of the first lens array 4.

The light 9 coming from the light source 1 and the reflector 2, which are disposed on the lower left side of the figure but not shown here, is separated, by the polarization separation action of the blazes 3a of the birefringent diffraction grating 3, into light 9a having a predetermined polarization plane, indicated by solid lines, and light 9b having a polarization plane perpendicular thereto, indicated by broken lines. These two types of light pass through the individual lens cells A, B, C, and D arranged in a substantially square grid-like formation in the first lens array 4 and then form, on each of the individual lens cells Aa, Ba, Ca, and Da arranged in a rectangular grid-like formation in the second lens array 6 and divided along different directions from the first lens array 4, a pair of a light-source image having the predetermined polarization plane and a light-source image having the polarization plane perpendicular thereto.

To achieve proper projection of the light-source images from the lens cells A, B, C, and D, arranged in one way, to the lens cells Aa, Ba, Ca, and Da, arranged in a different way therefrom, the individual lens cells A, B, C, and D of the first lens array 4 are each so arranged as to have a slight inclination or have a decentered lens vertex; that is, the vertex of these lens cells is deviated from the center thereof.

Similarly, the individual lens cells Aa, Ba, Ca, and Da of the second lens array 6 are each so arranged as to have a slight inclination or have a decentered lens vertex.

In each pair, the two light-source images lie apart from each other in an exact row along the direction in which the birefringent diffraction grating 3 separates the light, i.e. in the direction of the longer sides of the individual lens cells of the second lens array 6. Moreover, as indicated by solid-line and broken-line ellipses (circles if seen from the front side of the lens array), these light-source images are projected on the individual lens cells of the second lens array 6 in such a way as to have an appreciable size. It is to be noted that, in the example under discussion, with respect to the first lens array 4 as seen from the light source side, a coordinate system is assumed to have a y axis pointing upward and an x axis pointing rightward, and, with respect to the second lens array 6 as seen from the light source side, a coordinate system is assumed to have a ya axis pointing toward the upper right and an xa axis pointing toward the lower right along the sides of the individual lens cells.

With this construction, it is possible to minimize the overlap between the light-source images projected on the second lens array 6, and thus to perform polarization conversion efficiently. Here, it is possible to make uniform the polarization plane of the separated light-source images, for example, by attaching strip-shaped half-wave plates 5 along the rows of the light-source images indicated by the broken-line ellipses. It is to be noted that, in this embodiment, the light source has the same size and the lens cells of the second lens array 6 have the same area as in a conventional construction where the individual lens cells of the first and second lens arrays are arranged in the same way (with their sides aligned in the same directions).

Moreover, this embodiment employs two-stage integrators, i.e. the first and second integrator optical systems, and therefore allows the lens cells of the lens arrays to be adapted to the aspect ratio of the display panel 16 by the second integrator optical system. Thus, the first lens array 4, disposed within the first integrator optical system, can have nearly square lens cells, and this enhances the effect of arranging the individual lens cells of the first lens array 4 and those of the second lens array 6 with their sides aligned in different directions.

Figure 3:
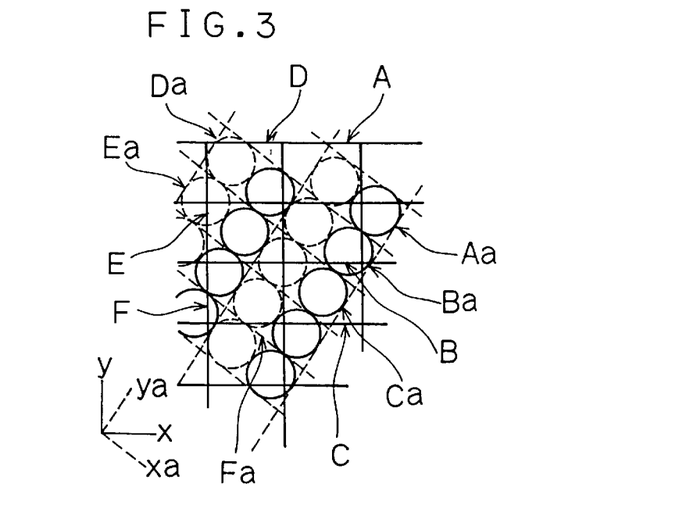
FIG. 3 is a front view schematically showing the positional relationship between the first and second lens arrays in a case where only one-stage integrator is used.

In a case where only one-stage integrator is employed, the first lens array 4 needs to have lens cells that are so shaped as to have an aspect ratio nearly equal to that of the display panel 16. Even in this case, by arranging the individual lens cells of the first lens array 4 and those of the second lens array 6 with their sides aligned in different directions, it is possible to achieve higher illumination efficiency than in a conventional construction where the sides are aligned in the same directions. FIG. 3 is a front view schematically showing the positional relationship between the first and second lens arrays in a case where only one-stage integrator is used, assuming that the aspect ratio is 4:3. As shown in this figure, one of the directions of the diagonals of the individual lens cells, indicated by solid lines, of the first lens array 4 coincides with the direction of the longer sides of the individual lens cells, indicated by broken lines, of the second lens array 6.

The light 9 coming from the light source 1 and the reflector 2 (neither is shown here) is separated, by the polarization separation action of the birefringent diffraction grating 3 (not shown), into light having a predetermined polarization plane and light having a polarization plane perpendicular thereto. These two types of light pass through the individual lens cells A, B, C, D, E, and F arranged in a grid-like formation having an aspect ratio of 4:3 in the first lens array 4 and then form, on each of the individual lens cells Aa, Ba, Ca, Da, Ea, and Fa arranged in a rectangular grid-like formation in the second lens array 6 and divided along different directions from the first lens array 4, a pair of a light-source image having the predetermined polarization plane and a light-source image having the polarization plane perpendicular thereto.

In each pair, the two light-source images lie apart from each other in an exact row along the direction in which the birefringent diffraction grating 3 separates the light. Moreover, as indicated by solid-line and broken-line circles, these light-source images are projected on the individual lens cells of the second lens array 6 in such a way as to have an appreciable size. It is to be noted that, in the example under discussion, with respect to the first lens array 4 as seen from the light source side, a coordinate system is assumed to have a y axis pointing upward and an x axis pointing rightward, and, with respect to the second lens array 6 as seen from the light source side, a coordinate system is assumed to have a ya axis pointing toward the upper right and an xa axis pointing toward the lower right along the sides of the individual lens cells. As demonstrated in FIG. 2, the x axis and the y axis of the first lens array 4 form a first coordinate system having two orthogonal directions. Likewise, the xa axis and the ya axis of the second lens array 6 form a second coordinate system having two orthogonal directions. Both coordinate systems have a regular grid formation i.e., they are arranged periodically. Further, the second coordinate system is rotated with respect to the first coordinate system about a common normal axis.

In this embodiment, as shown in FIG. 2, the direction in which the birefringent diffraction grating 3 exhibits birefringence is aligned with the direction along which the blazes 3a are formed, i.e. the ya-axis direction, and therefore the two types of light 9a and 9b after separation by polarization, indicated by solid and broken lines, respectively, and thus the two types of light-source images resulting therefrom, have polarization planes along the xa-axis and ya-axis directions. Before the two types of light enter the next optical system, their polarization planes need to be made to point uniformly in the y-axis direction. To achieve this, to the individual rows of the two types of light-source images, two corresponding types of strip-shaped half-wave plates are attached that have optical axes intersecting each other at 45°. In this way, the polarization planes of the two types of light are made uniform simultaneously.

As another way to make the polarization planes uniform, it is also possible, by the use of strip-shaped half-wave plates attached to the rows of one of the two types of light-source images, to make the polarization plane thereof uniform with that of the other, and then, by the use of a half-wave plate attached over the entire surface of the second lens array 6, to make the polarization planes of both types of light point in the y-axis direction. The direction in which the birefringent diffraction grating exhibits birefringence may be aligned not with the direction along which the blazes 3a are formed, i.e. the direction of the longer or shorter sides of the individual lens cells of the second lens array 6, but with the direction of the longer or shorter sides of the individual lens cells of the first lens array 4. Polarization separation may be achieved by any other method than by using a birefringent diffraction grating.

Figure 4:
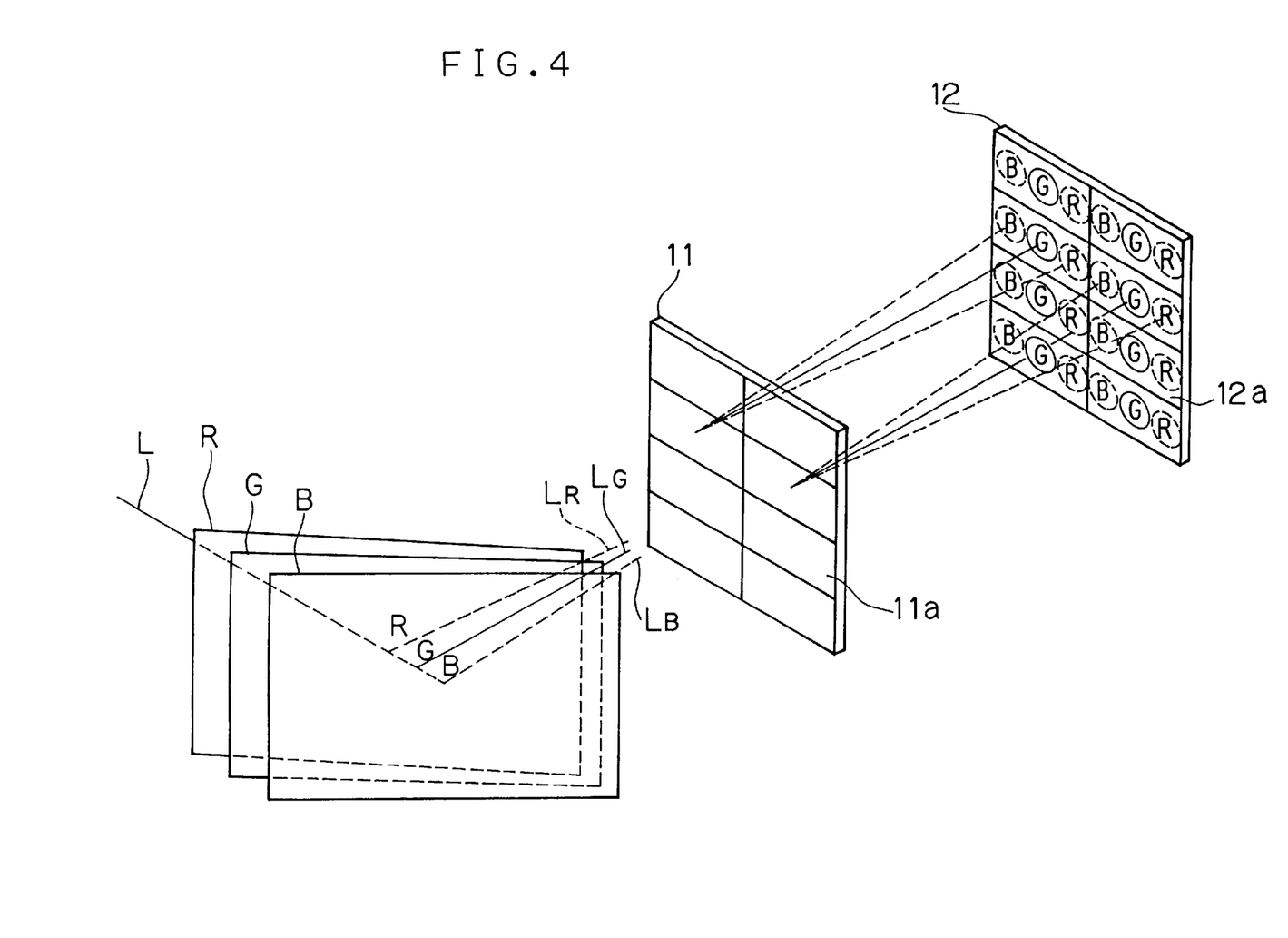
FIG. 4 is an exploded perspective view schematically showing the relationship between the dichroic mirrors and the third and fourth lens arrays.

FIG. 4 is an exploded perspective view schematically showing the relationship between the dichroic mirrors and the third and fourth lens arrays used in this embodiment. As shown in FIG. 1, between the first superimposing lens 8 disposed immediately behind the second lens array 6 and the condenser lens 10 (neither is shown in FIG. 4), the dichroic mirrors R, G, and B that reflect light of the frequency ranges corresponding to R (red), G (green), and B (blue), respectively, are disposed with different inclinations. Thus, the light having passed through the first superimposing lens 8 along the optical axis L is reflected by the dichroic mirrors R, G, and B individually so as to reach the condenser lens 10 by traveling along differently inclined optical axes $L_R$, $L_G$, and $L_B$, respectively.

As a result of the polarization conversion performed by the birefringent diffraction grating and the first and second lens arrays, the polarization plane of the light striking the individual dichroic mirrors is uniform, and this permits the dichroic mirrors to exhibit sharp color separation characteristics and thereby offer satisfactory color purity. A dichroic mirror exhibits different color separation characteristics for light having different polarization planes, and therefore shining non-polarized light on a dichroic mirror results in poor color separation and thus unsatisfactory color purity.

The light having reached the condenser lens 10 from different directions for its R, G, and B components is then focused, through the individual lens cells 11a of the third lens array 11 disposed immediately behind the condenser lens 10, on the individual lens cells 12a of the fourth lens array 12 disposed somewhat away behind it. Here, since the R, G, and B components travel in different directions, three separate light-source images are formed one for each component. In this embodiment, the third and fourth lens arrays 11 and 12 each have their lens cells arranged in two columns as shown in FIG. 4, and therefore such light-source images are formed individually in six columns, namely RGBRGB, in total.

In this embodiment, as described previously, two-stage integrators, i.e. the first and second integrator optical systems, are employed. This helps minimize variations in brightness (differences in intensity) among the light-source images focused on the fourth lens array 12 disposed within the second integrator optical system, and also minimize the number of light-source images and thus the number of divisions of the lens arrays. For example, in FIG. 4, for the G component, light-source images of identical intensity are formed in as few as two columns. It is to be noted that it is customary to divide the first lens array in four columns or more along the coarser sides (i.e. along the direction, either vertical or horizontal, in which fewer divisions are made), and divide the third lens array as few as two to four columns along the coarser sides.

In this embodiment, the optical system is constituted of the first-stage integrator (the first integrator optical system), the dichroic mirrors for color separation, and the second-stage integrator (the second integrator optical system). In a case where only one-stage integrator is used, the optical system is usually constituted of, from the light source side, the integrator and then the dichroic mirrors. The purpose of disposing the second-stage integrator behind the dichroic mirrors in this embodiment is to suppress unnecessary color shades resulting from light striking the dichroic mirrors at different angles of incidence.

Figure 5:
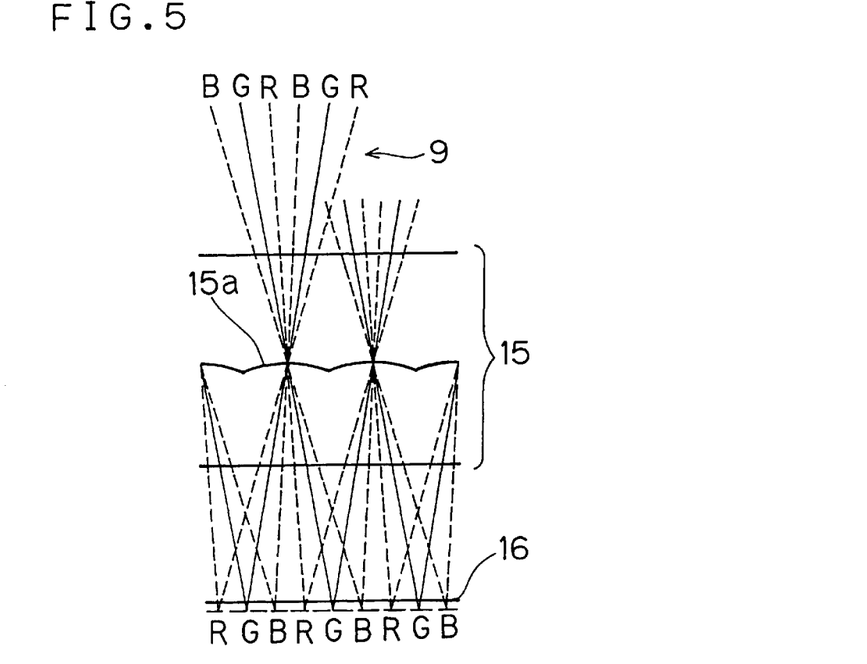
FIG. 5 is a diagram schematically showing the relationship between the birefringent microlens array and the display panel.

FIG. 5 is a diagram schematically showing the relationship between the birefringent microlens array and the display panel used in this embodiment. As shown also in FIG. 1, immediately in front of the display panel 16 is disposed a birefringent microlens array 15 that is made of a birefringent optical material. The light 9 having been subjected to color separation by the dichroic mirrors and the third and fourth lens arrays so as to be separated into R, G, and B components is then made to strike the display panel 16 by this birefringent microlens array 15 in such a way that the R, G, and B components illuminate the R, G, and B pixels, respectively, of the display panel 16. It is to be noted that FIG. 5 shows only parts of the birefringent microlens array 15 and the display panel 16, i.e. the remaining parts thereof extending further rightward and leftward are omitted.

In this embodiment, where two-stage integrators are used, no unnecessary color shades appear among the light-source images, and each of the microlenses 15a constituting the microlens array 15 handles as few as two or three (in this embodiment, two) columns of light-source images for each of the R, G, and B components. As a result, an appropriate distance of 200 to 300 $\mu$m is secured between the birefringent microlens array 15 and the pixels of the display panel 16, and thus a brightness above the diffraction limit, namely an f-number of 4 to 5, is obtained in each of the microlenses 15a, making satisfactory condensation of light possible.

A liquid crystal display panel of a modern design that is used as the display panel 16 typically has a pixel-to-pixel pitch of 10 to 20 $\mu$m to cope with the trend toward higher resolution. In this embodiment, the amount of blurring (1.22×wavelength $\lambda$×f-number) resulting from the diffraction occurring in each microlens is 2 to 3 $\mu$m, which is only a fraction of the pixel-to-pixel pitch. Thus, no appreciable blurring results from diffraction.

Figure 6:
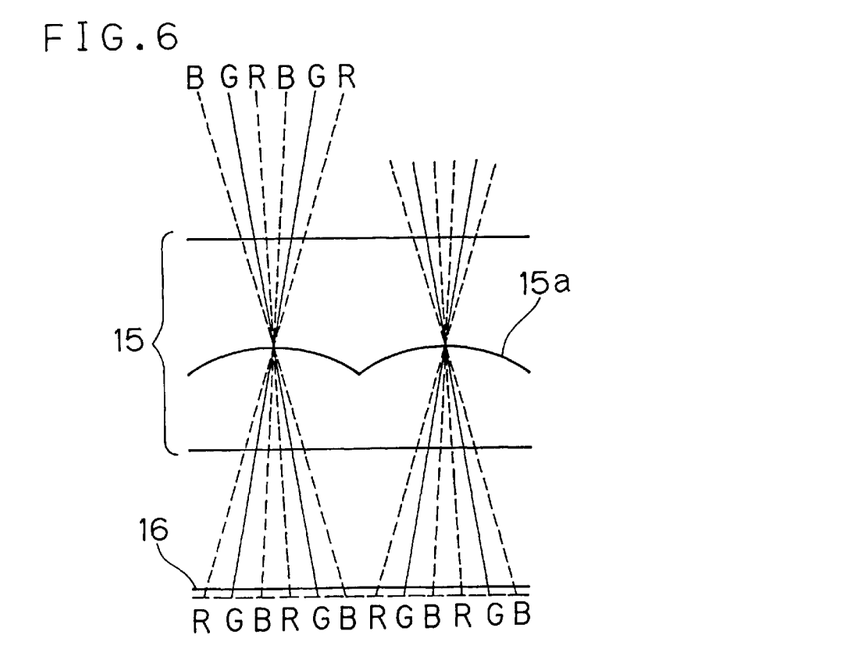
FIG. 6 is a diagram schematically showing a case where one lens is used for two pixel groups.

Moreover, in this embodiment, where two-stage integrators are used, there occurs almost no difference in intensity among the light-source images formed on the fourth lens array 12, and therefore no unnecessary color shades appear even if, as shown in FIG. 6, the birefringent microlens array 15 used is so designed that each of its constituent lenses (microlenses 15a) handles two pixel groups (here, a pixel group denotes a group of three, namely R, G, and B, pixels on the display panel). In this figure, whereas the focal length (i.e. the distance between the microlenses and the pixels) is the same as in FIG. 5, the microlenses are arranged with twice the pitch as compared with those shown in FIG. 5, and are thus easier to produce. If this method is applied to a conventional construction where only onestage integrator is used, every pixel group on the display panel receives light from different light-source images formed on the lens array, and thus a difference in brightness occurs between every two adjacent pixel groups.

Figure 7:
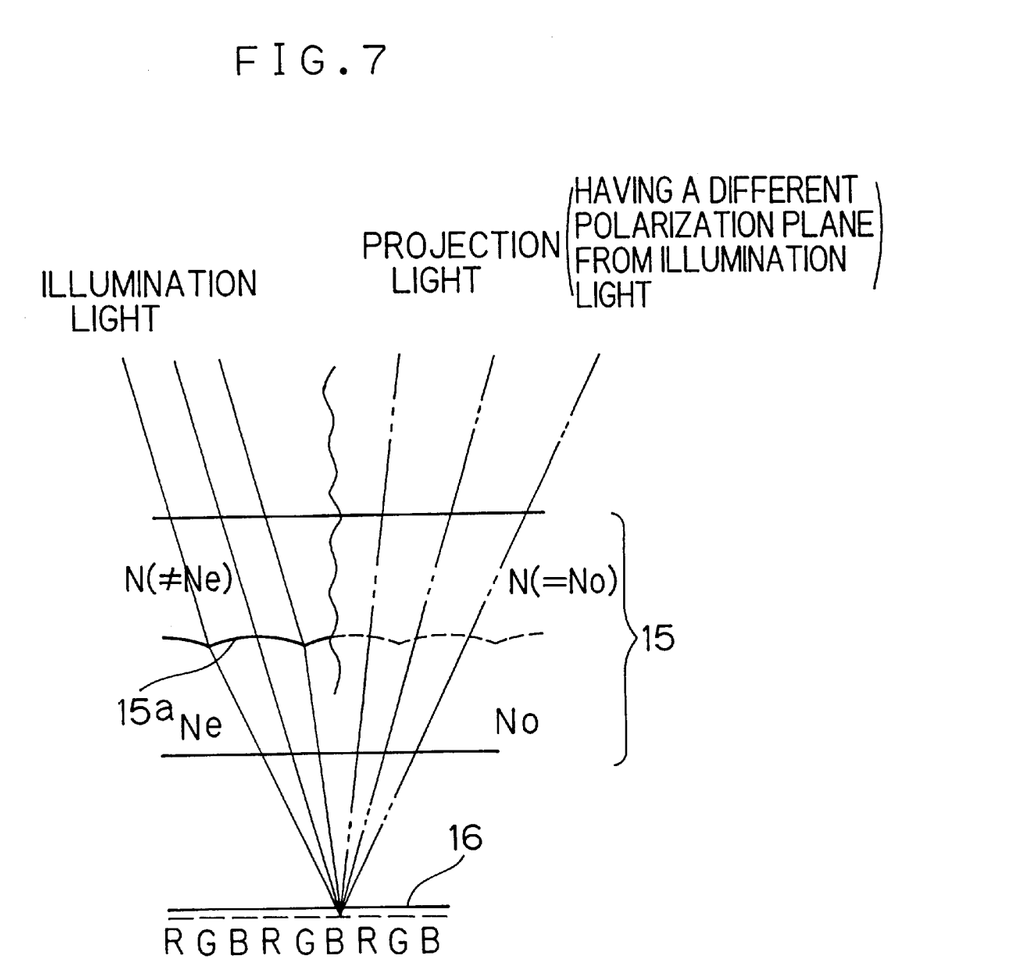
FIG. 7 is a diagram schematically showing the structure of the material of the birefringent microlens array.

FIG. 7 is a diagram schematically showing the structure of the material of the birefringent microlens array. In this embodiment, a reflection-type liquid crystal display panel is used as the display panel 16, and therefore both the illumination light traveling toward the display panel 16 and the projection light reflected from the display panel 16 pass through the birefringent microlens array 15 (or a lenticular optical element, i.e. an optical element having a lens-like section, such as a cylinder lens array) disposed immediately in front of the display panel 16. Whereas the illumination light traveling toward the display panel 16 behaves as described above, the projection light reflected therefrom, if left as it is, is disturbed by the birefringent microlens array 15, and this degrades image quality.

To cope with this, in this embodiment, the birefringent microlens array 15 is made of an isotropic optical material and a birefringent optical material. In FIG. 7, whereas the illumination light traveling toward the display panel 16 has a particular polarization plane, for example a polarization plane perpendicular to the plane of the figure, the projection light, i.e. the portion of the reflected light that is used to display an image, has a polarization plane rotated relative thereto, for example a polarization plane along the plane of the figure.

Here, suppose that, of the materials of which the birefringent microlens array 15 is made, the isotropic optical material, which is used above the microlenses 15a, has a refractive index N, and the birefringent optical material, which is used below the microlenses 15a, exhibits a refractive index Ne for the polarization plane of the illumination light and a refractive index No for the polarization plane of the projection light. Then, if N=No, the birefringent microlens array 15 acts as a microlens array toward the illumination light and acts as a simple transparent flat plate toward the projection light. In this way, despite the use of a reflection-type display panel, it is possible to prevent degradation of image quality in the projection light.

In FIG. 7, to make the point easier to grasp, the illumination light is illustrated as striking the display panel 16 from an oblique direction and then reflecting as the projection light in an oblique direction on the opposite side. However, in reality, the principal optical axes of both the illumination and projection light are perpendicular to the display panel 16. It is to be noted that FIGS. 6 and 7 show only parts of the birefringent microlens array 15 and the display panel 16, i.e. the remaining parts thereof extending further rightward and leftward are omitted. The optical elements thus far described, starting with the light source 1 and ending with the birefringent microlens array 15, together constitute the illumination optical apparatus.

Figure 8:
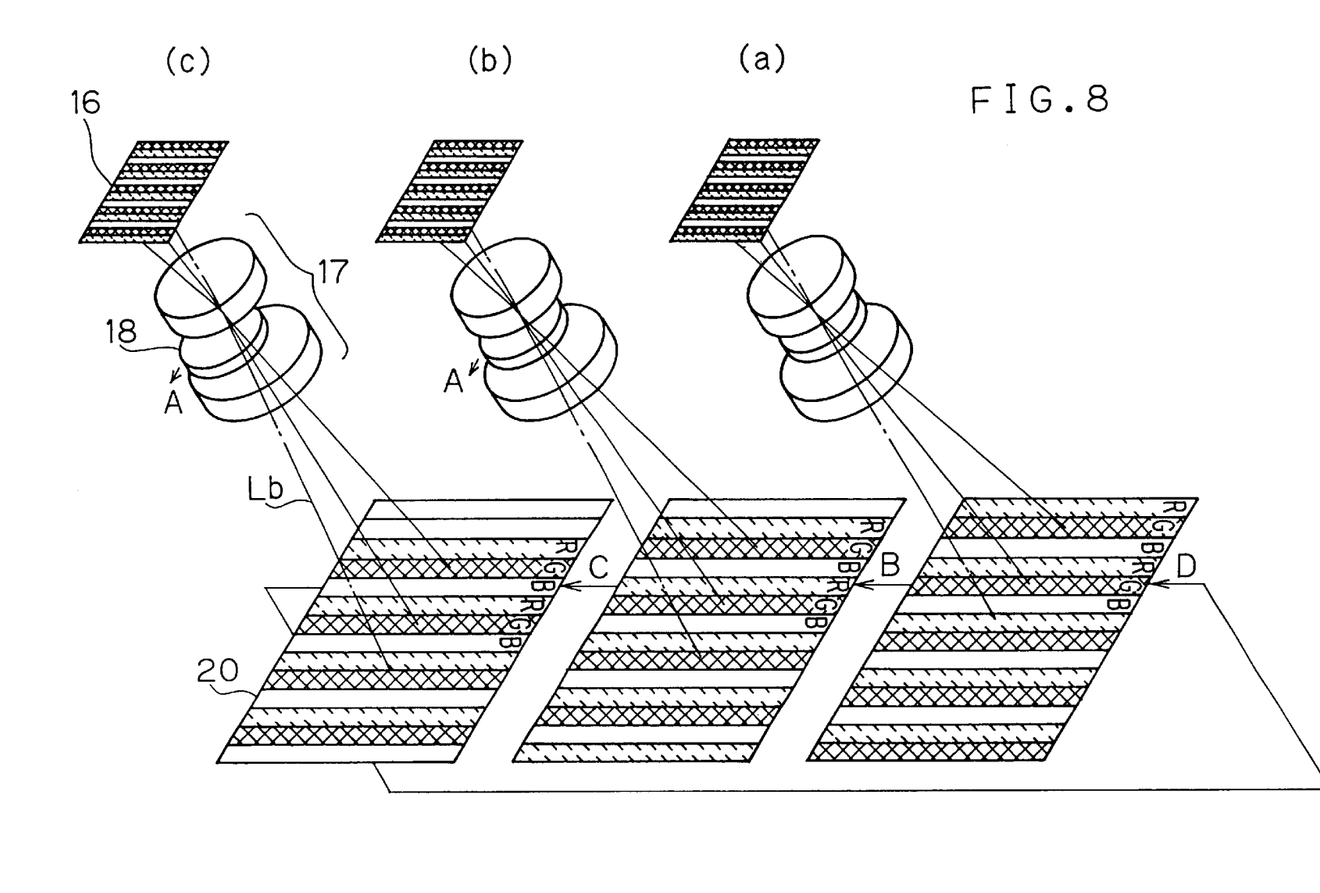
FIG. 8 is a perspective view schematically showing the principle of pixel shifting in the projection optical system.

FIG. 8 is a perspective view schematically showing the principle of pixel shifting in the projection optical system. In this embodiment, only a single display panel 16 is used. Therefore, to achieve display with resolution corresponding to the XGA format (1024 by 768 pixels), as many pixels are needed for each of R, G, and B colors, and thus the single display panel theoretically needs to have three times the number of pixels required in the XGA format. This makes the display panel unduly large and expensive. To avoid this, although a single display panel is used that has just so many pixels as required in the XGA format, colored display in the XGA format is achieved by shifting the pixels displayed on the screen at high speed.

Specifically, part of the projection optical system 17 shown in FIG. 8 is, as an image shift lens 18, driven at high speed in a direction perpendicular to the optical axis Lb as indicated by arrows A in such a way that, if attention is concentrated on the rows on the screen 20 that are initially illuminated by the G component as shown at (a) in the figure, the same rows are then (as indicated by an arrow B) illuminated by the R component as shown at (b), then (as indicated by an arrow C) illuminated by the B component as shown at (c), then (as indicated by an arrow D) illuminated by the G component again as shown at (a), and so forth. In this way, three states are switched cyclically from one to the next at high speed, and what is displayed is changed according as the states are switched.

The image shift lens 18 is driven by the actuator 19 shown in FIG. 1 through a stroke of the same order as the pixel size, i.e. from 10 μm to tens of microns, at a time. As the actuator, for example an MC (moving coil), MM (moving magnet), or the like is used because it offers a high output and is thus suitable for high-speed driving.

Figure 9A:
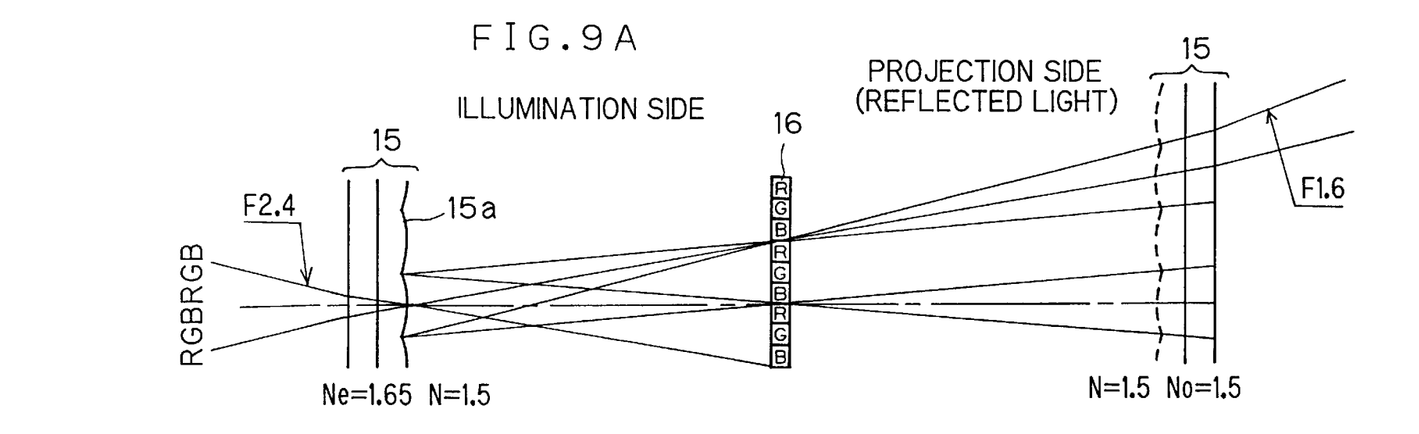
FIGS. 9A and 9B are diagrams schematically showing the relationship between the birefringent microlens array and the display panel in a case where the display panel is designed to exert a lens-like effect.
Figure 9B:
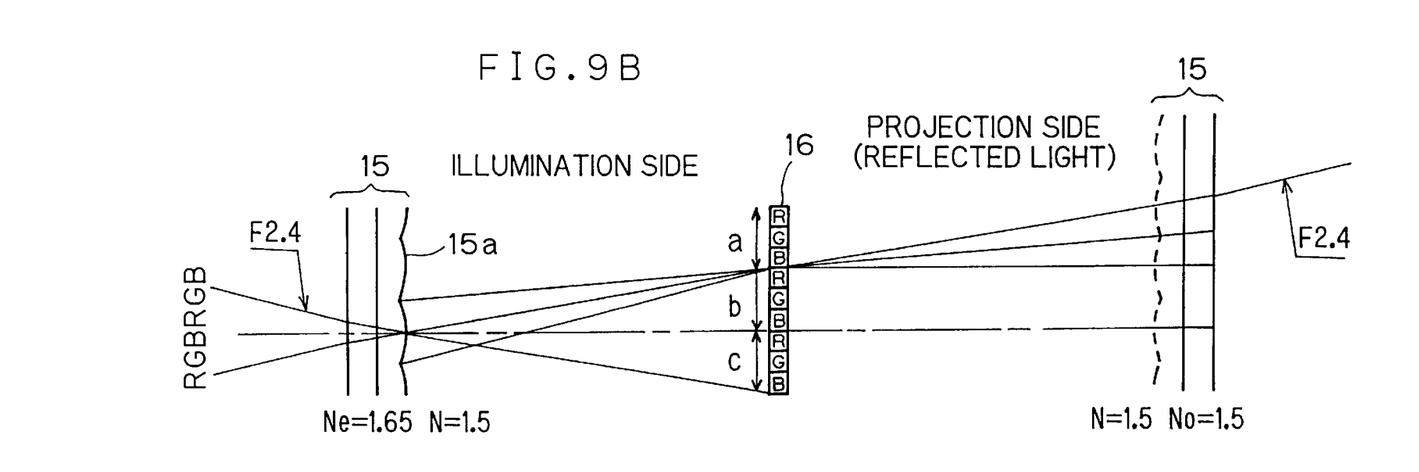

FIGS. 9A and 9B are diagrams schematically showing the relationship between the birefringent microlens array and the display panel in a case where the display panel is designed to exert a lens-like effect in this embodiment. FIG. 9A shows a case where an ordinary reflection-type liquid crystal display panel is used as the display panel 16, and FIG. 9B shows, for comparison therewith, a case where a reflection-type liquid crystal display panel exerting a lens-like effect is used as the display panel 16. It is to be noted that, in reality, the illumination light coming from the birefringent microlens array 15 is reflected by the display panel 16 so as to return as the projection light to the birefringent microlens array 15, but that, in these figures, the optical paths of the illumination and projection light are shown in an unfolded manner, i.e. separately on the left and right sides, respectively, of the display panel 16.

In these figures, suppose that, when the illumination light coming from the birefringent microlens array 15 (here, the refractive indices are Ne=1.65 and N=1.5) strikes the display panel 16, the f-number is initially about 2.4, and each of the microlenses 15a handles light beams corresponding to two pixel groups, i.e. six light beams RGBRGB. In the ordinary case shown in FIG. 9A, those light beams are reflected by the display panel 16 so as to return as the projection light to the birefringent microlens array 15 (here, the refractive indices are N=1.5 and No=1.5) and then travel further toward the projection optical system (not shown). Meanwhile, the light beams diverge and eventually come to have an f-number as small (bright) as about 1.6. This requires that the projection optical system used also have an f-number of about 1.6, and thus makes the apparatus as a whole unduly large and expensive.

By contrast, as shown in FIG. 9B, if the regions indicated by arrows a, b, and c, i.e. regions corresponding one to one to individual pixel groups, of the display panel 16 are each given an optical power that exerts a lens-like effect, the projection light keeps an f-number of about 2.4 when it leaves the birefringent lens array 15. This permits the use of a projection optical system having an f-number of about 2.4, and thus makes the apparatus as a whole compact and inexpensive.

Figure 10A:
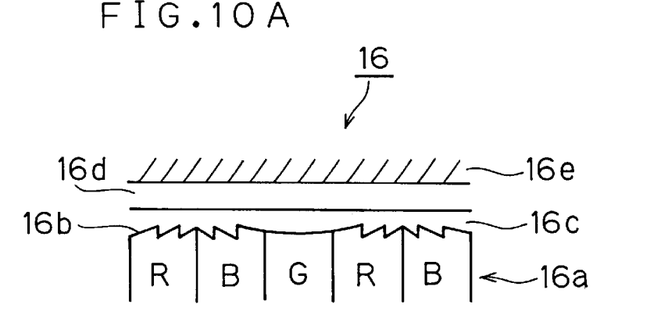
FIGS. 10A and 10B are diagrams schematically showing the structure of a reflection-type liquid crystal display panel that is designed to exert a lens-like effect.

FIGS. 10A and 10B are diagrams schematically showing the structure of a reflection-type liquid crystal display panel that is designed to exert such a lens-like effect. As shown in FIG. 10A, in a base portion of the display panel 16, pixels 16a are arranged, and, on the top surfaces thereof, reflection-type diffraction gratings 16b are formed one for each pixel group. These reflection-type diffraction gratings 16b are made of aluminum, and serve also as electrodes. To fill the surface irregularities of the reflection-type diffraction gratings 16b, on the top surfaces thereof, a transmission layer 16c made of a resin material or the like is laid. Further on top, a ferroelectric liquid crystal layer 16d is formed, and, further on top, a top glass plate 16e is placed that is a transplant flat plate. The reflection-type diffraction gratings 16b give the display panel 16 the optical power that exerts a lens-like effect when the display panel 16 reflects the illumination light.

Figure 10B:
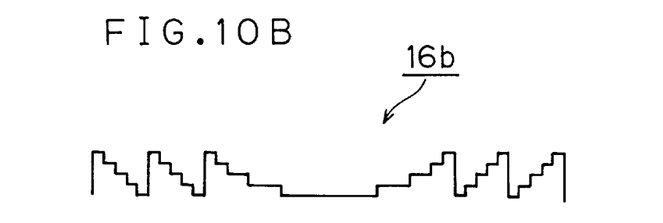

A reflection-type diffraction grating is produced, like an ordinary IC, by forming layers over one another. Accordingly, the reflection-type diffraction gratings 16b are produced by forming layers of aluminum over one another in such a way as to have a stepped section as shown in FIG. 10B. In this example, the gratings have four steps and a uniform height.

As described above, according to the present invention, it is possible to realize an illumination optical apparatus that achieves uniform illumination of a display panel with higher illumination efficiency.

What is claimed is:

1. An illumination optical apparatus comprising:
   a light source for emitting illumination light;
   a first lens array having lens cells arranged regularly in a regular grid formation in a first coordinate system, the lens cells of the first lens array individually focusing the illumination light incident thereon in different positions corresponding thereto;
   a second lens array having lens cells arranged regularly in a regular grid formation in a second coordinate system, the second coordinate system being rotated relative to the first coordinate system about a common normal axis, the lens cells of the second lens array being disposed in the positions in which the lens cells of the first lens array focus the illumination light; and
   a polarization separation device disposed between the light source and the second lens array, the polarization separation device separating the illumination light coming from the light source in such a way that, through each of the lens cells of the first lens array, two components of the illumination light having mutually different polarization planes form two separate light-source images that are apart from each other along a direction of one side of the individual lens cells of the second lens array.

2. An illumination optical apparatus as claimed in claim 1,
   wherein the direction of one side of the individual lens cells of the second lens array is aligned whih a direction of a diagonal of the individual lens cells of the first lens array.

3. An illumination optical apparatus as claimed in claim 1,
   wherein the polarization separation device is a birefringent diffraction grating.

4. An illumination optical apparatus as claimed in claim 1,
   wherein the two light-source images having mutually different polarization planes are made to have an identical polarization plane by being passed through half-wave plates having mutually different optical axes.

5. A projection optical apparatus comprising:
   an illumination optical apparatus having:
      a light source for emitting illumination light;
      a first lens array having lens cells arranged regularly in a regular grid formation in a first coordinate system, the lens cells of the first lens array individually focusing the illumination light incident thereon in different positions corresponding thereto;
      a second lens array having lens cells arranged regularly in a regular grid formation in a second coordinate system, the second coordinate system being rotated relative to the first coordinate system about a common normal axis, the lens cells of the second lens array being disposed in the positions in which the lens cells of the first lens array focus the illumination light;
      a polarization separation device disposed between the light source and the second lens array, the polarization separation device separating the illumination light coming from the light source in such a way that, through each of the lens cells of the first lens array, two components of the illumination light having mutually different polarization planes form two separate light-source images that are apart from each other along a direction of one side of the individual lens cells of the second lens array;
   a display panel for displaying an image to be projected, the display panel being illuminated by the illumination light; and
   a projection optical system for projecting the displayed image onto a screen.

6. A projection optical apparatus as claimed in claim 5,
   wherein, in the illumination optical apparatus, the direction of one side of the individual lens cells of the second lens array is aligned with a direction of a diagonal of the individual lens cells of the first lens array.

7. A projection optical apparatus as claimed in claim 5,
   wherein, in the illumination optical apparatus, the polarization separation device is a birefringent diffraction grating.

8. A projection optical apparatus as claimed in claim 5,
   wherein, in the illumination optical apparatus, the two light-source images having mutually different polarization planes are made to have an identical polarization plane by being passed through half-wave plates having mutually different optical axes.

9. An illumination optical apparatus comprising:
   a light source for emitting illumination light;
   a first lens array having lens cells arranged regularly in two orthogonal directions in a first coordinate system, the lens cells of the first lens array individually focusing the illumination light incident thereon in different positions corresponding thereto;
   a second lens array having lens cells arranged regularly in two orthogonal directions in a second coordinate system, the second coordinate system being rotated relative to the first coordinate system about a common normal axis, the lens cells of the second lens array being disposed in the positions in which the lens cells of the first lens array focus the illumination light; and
   a polarization separation device disposed between the light source and the second lens array, the polarization separation device separating the illumination light coming from the light source in such a way that, through each of the lens cells of the first lens array, two components of the illumination light having mutually different polarization planes form two separate light-source images that are apart from each other along a direction of one side of the individual lens cells of the second lens array.

10. A projection optical apparatus comprising:
    an illumination optical apparatus having:
       a light source for emitting illumination light;
       a first lens array having lens cells arranged regularly in two orthogonal directions in a first coordinate system, the lens cells of the first lens array individually focusing the illumination light incident thereon in different positions corresponding thereto;
       a second lens array having lens cells arranged regularly in two orthogonal directions in a second coordinate system, the second coordinate system being rotated relative to the first coordinate system about a common normal axis, the lens cells of the second lens array being disposed in the positions in which the lens cells of the first lens array focus the illumination light;
       a polarization separation device disposed between the light source and the second lens array, the polarization separation device separating the illumination light coming from the light source in such a way that, through each of the lens cells of the first lens array, two components of the illumination light having mutually different polarization planes form two separate light-source images that are apart from each other along a direction of one side of the individual lens cells of the second lens array;

a display panel for displaying an image to be projected, the display panel being illuminated by the illumination light; and a projection optical system for projecting the displayed image onto a screen.

11. An illumination optical apparatus comprising:

a light source for emitting illumination light;

a first lens array having lens cells arranged periodically in two orthogonal directions thereby defining a first coordinate system, the lens cells of the first lens array individually focusing the illumination light incident thereon in different positions corresponding thereto;

a second lens array having lens cells arranged periodically in two orthogonal directions thereby defining a second coordinate system, the second coordinate system being rotated with respect to the first coordinate system about a common normal axis, the lens cells of the second lens array being disposed in the positions in which the lens cells of the first lens array focus the illumination light; and a polarization separation device disposed between the light source and the second lens array, the polarization separation device separating the illumination light coming from the light source in such a way that, through each of the lens cells of the first lens array, two components of the illumination light having mutually different polarization planes form two separate light-source images that are apart from each other along a direction of one side of the individual lens cells of the second lens array.

12. A projection optical apparatus comprising:

an illumination optical apparatus having:

a light source for emitting illumination light;

a first lens array having lens cells arranged periodically in two orthogonal directions thereby defining a first coordinate system, the lens cells of the first lens array individually focusing the illumination light incident thereon in different positions corresponding thereto;

a second lens array having lens cells arranged periodically in two orthogonal directions thereby defining a second coordinate system, the second coordinate system being rotated with respect to the first coordinate system about a common normal axis, the lens cells of the second lens array being disposed in the positions in which the lens cells of the first lens array focus the illumination light;

a polarization separation device disposed between the light source and the second lens array, the polarization separation device separating the illumination light coming from the light source in such a way that, through each of the lens cells of the first lens array, two components of the illumination light having mutually different polarization planes form two separate light-source images that are apart from each other along a direction of one side of the individual lens cells of the second lens array;

a display panel for displaying an image to be projected, the display panel being illuminated by the illumination light; and a projection optical system for projecting the displayed image onto a screen.

13. An illumination optical apparatus according to claim 1, wherein an angle of rotation of the first coordinate system and the second coordinate system is in the range of greater than zero degrees and less that 90 degrees.

14. A projection optical apparatus according to claim 5, wherein an angle of rotation of the first coordinate system and the second coordinate system is in the range of greater that zero degrees and less than 90 degrees.

* * * * *